United States Patent
Li et al.

(10) Patent No.: US 7,016,168 B2
(45) Date of Patent: Mar. 21, 2006

(54) METHOD OF INCREASING CPP GMR IN A SPIN VALVE STRUCTURE

(75) Inventors: Min Li, Dublin, CA (US); Kochan Ju, Monte Sereno, CA (US); Youfeng Zheng, San Jose, CA (US); Simon Liao, Fremont, CA (US); Jeiwei Chang, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 250 days.

(21) Appl. No.: 10/718,373

(22) Filed: Nov. 20, 2003

(65) Prior Publication Data

US 2005/0111148 A1    May 26, 2005

(51) Int. Cl.
*G11B 5/39* (2006.01)
(52) U.S. Cl. ............... 360/324.12; 360/324.1
(58) Field of Classification Search ..... None
See application file for complete search history.

(56) References Cited

U.S. PATENT DOCUMENTS

| | | | | |
|---|---|---|---|---|
| 5,627,704 | A | 5/1997 | Lederman et al. | 360/113 |
| 5,668,688 | A | 9/1997 | Dykes et al. | 360/113 |
| 5,731,937 | A | 3/1998 | Yuan | 360/113 |
| 5,880,912 | A | 3/1999 | Rottmayer | 360/113 |
| 6,198,609 | B1 | 3/2001 | Barr et al. | 360/322 |
| 6,205,008 | B1 | 3/2001 | Gijs et al. | 360/324 |
| 6,219,205 | B1 | 4/2001 | Yuan et al. | 360/319 |
| 6,222,707 | B1 * | 4/2001 | Huai et al. | 360/324.1 |
| 6,233,125 | B1 | 5/2001 | Knapp et al. | 360/317 |
| 6,317,297 | B1 | 11/2001 | Tong et al. | 360/314 |
| 6,347,022 | B1 | 2/2002 | Saito | 360/126 |
| 6,819,532 | B1 * | 11/2004 | Kamijo | 360/324.11 |
| 6,850,393 | B1 * | 2/2005 | Hara et al. | 360/321 |
| 6,903,904 | B1 * | 6/2005 | Li et al. | 360/324.11 |

OTHER PUBLICATIONS

Co-pending U.S. Appl. No. 10/392,118, filed Mar. 19, 2003, same assignee, "GMR Improvement in CPP Valve Head by Inserting a Current Channeling Layer (CCL)".
Co-pending U.S. Appl. No. 10/718,372, filed Nov. 20, 2003, same assignee, "Self-Alignment Scheme for Enhancement of CPP-GMR".

\* cited by examiner

*Primary Examiner*—Jefferson Evans
(74) *Attorney, Agent, or Firm*—George O. Saile; Stephen B. Ackerman

(57) ABSTRACT

A current-perpendicular-to-plane (CPP) giant magnetoresistive (GMR) sensor of the synthetic spin valve type is provided, the sensor comprising a GMR stack having a substantially square lateral cross-section, a Cu spacer layer of smaller square cross-section formed centrally on the GMR stack and a capped ferromagnetic free layer of substantially square, but even smaller cross-sectional area, formed centrally on the spacer layer. The stepped, reduced area geometry of the sensor provides a significant improvement in its GMR ratio (DR/R), a reduced resistance, R, and elimination of Joule heating hot-spots in regions of high resistance such as the antiferromagnetic pinning layer and its seed layer.

25 Claims, 3 Drawing Sheets

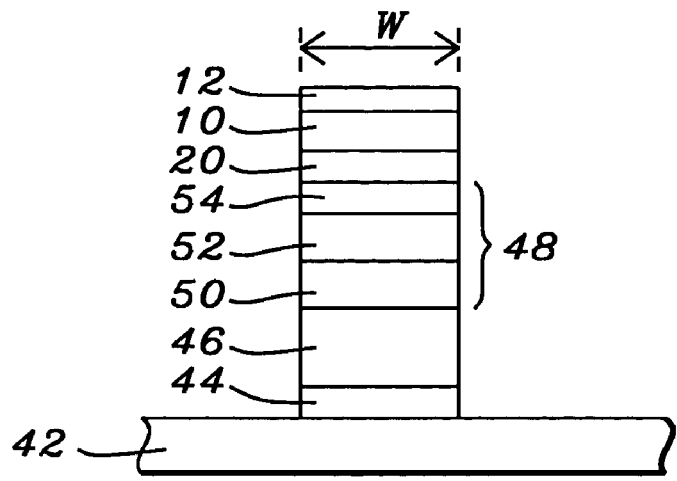
FIG. 1 – Prior Art
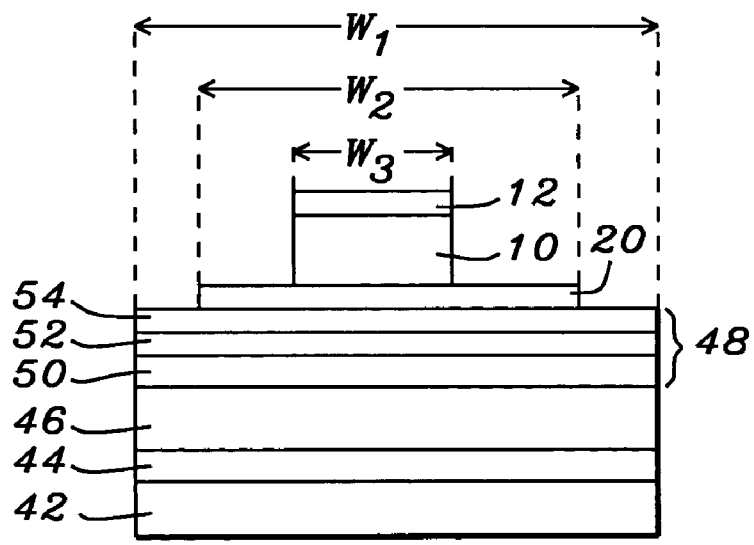
FIG. 2

METHOD OF INCREASING CPP GMR IN A SPIN VALVE STRUCTURE

RELATED PATENT APPLICATION

This application is related to Ser. No. 10/392,118, filing date Mar. 19, 2003 and to Ser. No. 10/718,373 filing date Nov. 20, 2003, all assigned to the same assignee as the current invention.

BACKGROUND OF THE INVENTION

1. Field of the Invention

This invention relates generally to the fabrication of giant magnetoresistive (GMR) magnetic field sensors of a "current-perpendicular-to-the-plane" (CPP) configuration. More particularly, it relates to such a sensor that is geometrically patterned, using a single electron beam formed mask and a self-aligned double lift-off scheme, to lower its resistance and redistribute its current in a manner that increases sensor sensitivity and eliminates local hot-spots caused by excessive Joule heating.

2. Description of the Related Art

Magnetic read sensors that utilize the giant magnetoresistive (GMR) effect for their operation are generally of the "current-in-the-plane" (CIP) configuration, wherein current is fed into the structure by leads that are laterally disposed to either side of an active sensor region and the current moves through the structure essentially within the planes of its magnetic and other conducting layers. Since the operation of GMR sensors depends on the detection of resistance variations in their active magnetic layers caused by changes in the relative directions of their magnetic moments, it is important that a substantial portion of the current passes through those layers so that their resistance variations can have a maximally detectable effect. Unfortunately, CIP GMR sensor configurations typically involve layer stacks comprising layers that are electrically conductive but not magnetically active and that play no role in providing resistance variations. As a result, portions of the current are shunted through regions that produce no detectable responses and, thereby, the overall sensitivity of the sensor is adversely affected. The CPP sensor configuration avoids this current shunting problem by disposing its conducting leads vertically above and below the active sensor stack, so that all of the current passes perpendicularly through all of the layers as it goes from the lower to the upper lead. The CPP configuration thereby holds the promise of being effective in reading magnetically recorded media having recording densities exceeding 100 Gbit/in$^2$.

The CPP configuration is not without its problems, however. Whereas current in the CIP configuration passes through parallel conducting layers, in the CPP configuration it passes through such layers in series. The inherent problem in the CIP configuration is the loss of current (and sensitivity) through conductive, but non-magnetic layers; the analogous problem in the CPP configuration is the large voltage drop across magnetically inactive high resistance layers, which tends to mask the voltage variations produced by the active layers. The GMR resistance ratio, DR/R, is typically on the very low order of 1% for the CPP design, because the DR is provided by variations of the low resistance, magnetically active layers, whereas R includes the high resistance of inactive layers. It is worth noting that the high value of R also increases Joule heating in the sensor, causes local hot-spots and, therefore, limits the allowable magnitude of the sensing current.

GMR stack designs favor the use of magnetically pinned layers that are pinned by antiferromagnetic (AFM) pinning layers. Antiferromagnetic materials used in such pinning layers, together with their seed layers, tend to be formed of high-resistance materials and it is these layers that provide a parasitic resistance, $R_{pa}$, that is included in R and lowers the sensitivity, DR/R, of the CPP sensor.

One approach to alleviating this problem is to discover and use low-resistance AFM materials. This would necessitate a difficult materials search. An alternative approach is to lower the effective parasitic resistance of the AFM layer by changing its geometry. That is the approach taken by the present invention, particularly as relates to the fabrication of a synthetic spin valve configuration, i.e. a configuration in which the pinned layer comprises a pair of ferromagnetic layers with antiparallel magnetizations coupled by an appropriate material layer formed between them and held in that configuration by a pinning layer of antiferromagnetic material.

The pertinent prior art cited below has offered no similar method for improving the sensitivity of the CPP design having a synthetic spin valve stack configuration. Lederman et al. (U.S. Pat. No. 5,627,704) discloses a CPP GMR stack structure formed within a gap located in one of two pole layers of a magnetic yoke structure which also has a transducing gap formed in an ABS plane. The two pole pieces of the yoke serve to guide magnetic flux to the GMR stack which has current leads above and below it and permanent magnet biasing layers horizontally disposed on either side of it. Yuan et al. (U.S. Pat. No. 5,731,937) discloses a CPP sensor configuration having sensing element dimensions in a particular ratio to current lead dimensions so that the efficiency of the element is thereby increased. Yuan et al. (U.S. Pat. No. 6,219,205) discloses a CPP sensor configuration wherein the sensor is recessed from the magnetically recorded surface being sensed and wherein the sensing surface of the sensor is covered by a dielectric layer which serves to protect the sensing layer from corrosion and other adverse effects resulting from close contact with the recorded surface.

Dykes et al. (U.S. Pat. No. 5,668,688) discloses a spin valve CPP configuration in which the active layers form a stack of uniform width disposed between upper and lower shield and conductor layers. Saito (U.S. Pat. No. 6,347,022) discloses a dual spin-valve configuration in which a magnetically free layer is sandwiched between magnetically pinned layers and which provides an advantageously vertically asymmetric structure and good resistance variations.

Rottmayer (U.S. Pat. No. 5,880,912) provides a GMR sensing element having a canted bias field which cancels the adverse affect of the field produced by the applied sensing current and thereby increases the magnitude of the sensing current that can be used.

Tong et al. (U.S. Pat. No. 6,317,297) provide a spin valve configuration with improved linearity and a wider temperature range for thermal stability. The configuration utilizes pinned layers which are pinned by the action of the sensing current during use of the sensor.

Although the prior art described above provide methods for improving the performance attributes of GMR spin valves in a CPP configuration, they do not address the problem of the high resistance of an AFM pinning layer and seed layer and its adverse affect on sensor sensitivity. In particular, the prior art does not discuss or disclose a method of forming such a CPP GMR sensor in which the geometry of the various layers permits a re-distribution of current within the sensor stack that effectively reduces its resistance and thereby increases it sensitivity.

SUMMARY OF THE INVENTION

Accordingly, it is a first object of this invention is to provide a novel current-perpendicular-to-plane (CPP) giant magnetoresistive (GMR) read-sensor stack structure of a synthetic spin valve configuration, having decreased resistance and improved sensitivity.

It is a second object of this invention to provide a sensor stack structure wherein the current path through said sensor stack does not produce local hot spots due to increased Joule heating effects.

The objects stated above will be achieved by a novel geometric configuration of a CPP synthetic spin valve design. For reference, there is shown in FIG. 1 a schematic of a prior art CPP GMR stack (typical, in its geometry, of all the prior art cited above) in which the stack formation comprises successive layers of uniform width formed on a conducting lead layer (42) of greater lateral (ie. horizontal) width than the stack layers. The layers include a seed layer (44), an antiferromagnetic pinning layer (46), a synthetic antiferromagnetic pinned layer (48) further comprising a second ferromagnetic layer (denoted AP2) (50), a coupling layer (52) and a first ferromagnetic layer (AP1) (54), a second Cu spacer layer (20), a ferromagnetic free layer (10) and a Cu capping layer (12). The width of the layers (W) are identical and the stack is, thereby, of uniform width.

In contrast, there is shown in FIG. 2 the CPP structure to be formed in the present invention. That structure provides a low resistance current path by means of a novel design in which a ferromagnetic free layer (10) and Cu capping layer (12) of small dimension (<0.1 micron), is formed on a Cu spacer layer (20) of slightly larger dimension (approximately 0.3 microns) and that spacer layer is formed on a GMR stack (40) of synthetic spin valve configuration having equal, uniform layer dimensions that were larger that either of the above (>0.3 microns). The GMR stack includes a lead layer (42), a seed layer (44), an antiferromagnetic pinning layer (46), and a synthetic antiferromagnetic pinned layer (48), further comprising a second ferromagnetic layer (denoted AP2) (50), a coupling layer (52) and a first ferromagnetic layer (AP1) (54). The resultant resistance of such a stack is greatly reduced (as is also disclosed in related applications HT1 02-003, fully incorporated herein by reference) compared to the prior art stack of uniform dimension shown in FIG. 1. In addition, the DR of such a stack is retained, or even enhanced, with the use of the large Cu spacer layers (20), since the spin diffusion length of electrons in Cu (the distance an electron can travel with its spin direction unchanged) is approximately 1500 angstroms. Therefore, the DR of the sensor (resistance change between parallel and antiparallel orientations of free and pinned layer magnetizations) is not changed, but the total resistance, R, is significantly reduced, so the GMR sensitivity, DR/R is increased. It is also to be noted that the dimensional differentials between the free layer (10), the spacer layer (20) and the synthetic antiferromagnetic pinned layer (48) produces an angle to the current that effectively provides the electrons a greater path length within the coupled layers of the pinning layer and a corresponding improvement in DR. This is indicated in a graphical representation of the longitudinal current component in the ferromagnetic layers of the synthetic pinned layer. In addition, the current density in the pinned layer is reduced since the current is distributed over a greater cross-sectional area, thereby also reducing the current-induced magnetic field and relaxing the pinning strength requirement on the antiferromagnetic pinning layer. Finally, the reduced resistance and elimination of hot spots in the high resistance seed layer and pinning layer allows a greater sensor current to be applied, increasing signal strength and further improving the sensitivity of the sensor.

BRIEF DESCRIPTION OF THE DRAWINGS

FIG. 1 is a schematic cross-sectional view through the air-bearing surface (ABS) of a prior art CPP GMR sensor configuration of the synthetic spin valve type.

FIG. 2 is a similar schematic cross-sectional view through the ABS of the CPP GMR configuration of the present invention.

DESCRIPTION OF THE PREFERRED EMBODIMENTS

Figure 3:
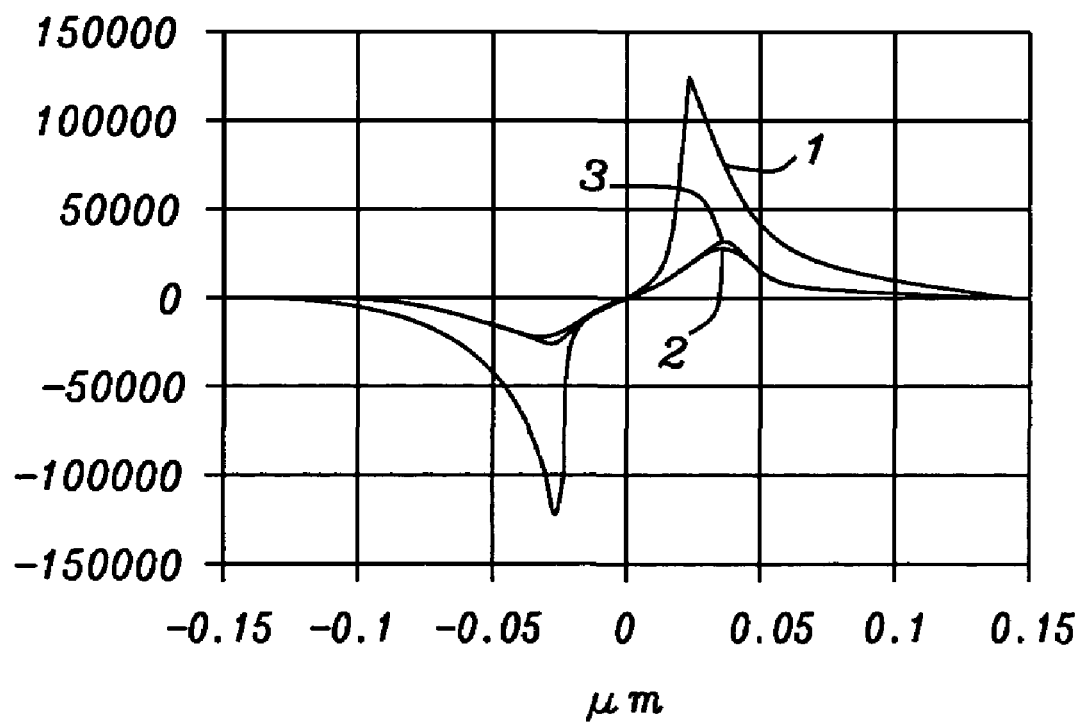
FIG. 3 is a graphical representation of longitudinal current flow in the two ferromagnetic layers of the synthetic antiferromagnetic pinned layer.

The present invention is a GMR spin valve sensor in a CPP (current-perpendicular-to-plane) synthetic pinned layer spin-valve configuration having a novel geometry that improves sensor sensitivity, DR/R, by maintaining (or improving) DR, while significantly reducing R. The novel design includes a ferromagnetic free layer of very small cross-sectional area, centered on a conducting, non-magnetic spacer layer of larger cross-sectional area, with the spacer layer then being centered on the remaining GMR sensor stack which is of still larger cross-sectional area. The step-wise reduction in cross-sectional areas of the layers leads to reduced current density in the pinned layer as well as a more longitudinal current path, both enhancing the performance of the sensor.

Referring again to FIG. 2, there is shown a schematic view of the CPP GMR spin valve sensor provided by the present invention. What will be referred to herein as the GMR stack comprises the following: a lead layer (42), a seed layer (44), formed on said lead layer, the seed layer being preferably a layer of NiCr formed to a thickness between approximately 20 and 70 angstroms, with approximately 40 angstroms being preferred, an antiferromagnetic pinning layer (46) formed on the seed layer, the layer being formed of an antiferromagnetic material such as MnPt, to a thickness between approximately 100 and 300 angstroms, with a thickness of approximately 150 angstroms being preferred, and, formed on the pinning layer, a synthetic antiferromagnetic pinned layer (48), further comprising a second ferromagnetic layer (denoted AP2) (50) formed on the pinning layer, a conducting, non-magnetic antiferromagnetically coupling layer (52) formed on AP2 and a first ferromagnetic layer (denoted AP1) (54) formed on the coupling layer. Layer AP2 is preferably a layer of ferromagnetic material such as CoFe formed to a thickness between approximately 30 and 60 angstroms, with approximately 30 angstroms being preferred. The antiferromagnetically coupling layer is preferably a layer of Ru formed to a thickness between approximately 6 and 9 angstroms, with approximately 8 angstroms being preferred. It is understood that other antiferromagnetically coupling materials such as Rh, Ir or Cr may be used, but they might have to be formed with different thicknesses. Layer AP1 is preferably a layer of CoFe formed to a thickness between approximately 30 and 60 angstroms, with approximately 30 angstroms being preferred. Each of the layers (44), (46), (48), (50) and (52) are formed with substantially the same square lateral (i.e., horizontal) cross-sectional areas and same lateral dimension, $W_1$, that is preferably greater than approximately 0.3 microns. There is then formed on this GMR stack a patterned, substantially square, conducting, non-magnetic spacer layer (20), said spacer layer being formed on the AP1 layer and the spacer layer being preferably a layer of Cu formed to a thickness between approximately 20 and 50 angstroms, with approximately 26 angstroms being preferred. The spacer layer is centered on the AP1 layer and has a smaller lateral dimension, $W_2$, between approximately 0.2 and 0.4 microns, with approximately 0.3 microns being preferred. A patterned ferromagnetic free layer (10) is formed on the spacer layer, said free layer being substantially square, centered on the spacer layer and of lateral dimension $W_3$, which is less than both $W_2$ and $W_1$, and is between approximately 0.03 and 0.1 microns, with less than 0.08 microns being preferred. The ferromagnetic free layer is preferably a layer of CoFe formed to a thickness of between approximately 20 and 50 angstroms, with approximately 30 angstroms being preferred. It is understood that other ferromagnetic materials such as CoNiFe or layered CoFe/NiFe can be used to form the ferromagnetic free layer as well as the antiferromagnetically pinned ferromagnetic layers AP1 and AP2 described above. The free layer is capped with a patterned capping layer of equal lateral dimension. The capping layer is preferably a layer of non-magnetic, conducting material such as Cu, formed to a thickness between approximately 5 and 50 angstroms, with approximately 10 angstroms being preferred.

The resistance of the sensor stack of FIG. 2 is greatly reduced (as is also disclosed in related applications HT1 02-003, fully incorporated herein by reference) compared to the prior art stack of uniform dimension shown in FIG. 1. In addition, the DR of such a stack is retained, or even enhanced, with the use of the Cu spacer layers (20) dimensioned as disclosed herein, since the spin diffusion length of electrons in Cu (the distance an electron can travel with its spin direction unchanged) is approximately 1500 angstroms. Therefore, the DR of the sensor (resistance change between parallel and antiparallel orientations of free and pinned layer magnetizations) is not changed, but the total resistance, R, is significantly reduced, so the GMR sensitivity, DR/R is increased. It is also to be noted that the dimensional differentials between the free layer (10), the spacer layer (20) and the synthetic antiferromagnetic pinned layer (48) produces an angle to the current that allows the electrons effectively a greater path length within the coupled layers (AP1 and AP2) of the pinning layer and a corresponding improvement in DR. In addition, the reduced resistance and elimination of hot spots in the high resistance seed layer and pinning layer allows a greater sensor current to be applied, increasing signal strength and further improving the sensitivity of the sensor.

The resistance, R, and the maximum resistance change, DR, have been calculated for the formation of FIG. 2, for a free layer having a lateral dimension of 0.05 microns and all other layers having a lateral dimension of 0.3 microns, and for a prior art formation with the same layer thicknesses and configuration as FIG. 2, but a having uniform lateral dimension for all layers of 0.05 microns. The results of these calculations show an enhancement of the GMR ratio (DR/R) by 86% for the configuration of the present invention relative to the prior art configuration. When the thickness of the Cu spacer layer is increased to approximately 100 angstroms (from 26 angstroms), the improvement of the GMR ratio is by 232%.

Referring finally to FIG. 3, there is shown a graphical indication of the longitudinal (x-component) component (in arbitrary units) of the current within the synthetic antiferromagnetic pinned layer and the spacer layer of the present invention. The current is measured in distances of microns away from the center of the layer, so the curves actually display variations from a current at the center which is nominally denoted as zero. The current within the two ferromagnetic layers, AP1 (3) and AP2 (2) is shown, as well as the current in an approximately 26 angstroms thick Cu spacer layer (3). The presence of this longitudinal component is one indication of the advantageous effects of the geometrical shape of the invention.

Within the preferred embodiment of the present invention, several methods can be found for patterning the GMR stack, patterning and positioning the spacer layer centrally on the GMR stack and patterning and positioning the capped free layer centrally on the spacer layer. One exemplary method for achieving the objects of the invention is illustrated schematically in FIGS. 4a, b and c.

Figure 4A:
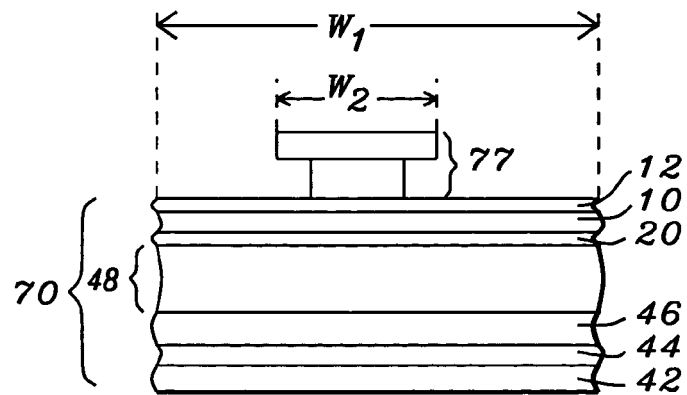
FIGS. 4a–c describe the method of forming the sensor.

Referring first to FIG. 4a, the process begins by forming a complete CPP multi-layer film stack (70), the stack having a lateral dimension $W_1$ and the stack comprising a substrate (42), a seed layer formed on the substrate (44), an antiferromagnetic pinning layer (46) formed on the seed layer, a synthetic antiferromagnetic pinned layer (48) (which is more fully described with reference to FIG. 2) formed on the pinning layer, a non-magnetic spacer layer (20) formed on the pinned layer, a ferromagnetic free layer formed on the spacer layer and a capping layer (12) formed on the free layer. The layers (70), (42), (44), (46) and (48) will be collectively denoted by (75) and have already been termed the GMR stack. A bi-layer lift-off photolithographic mask (77) of width $W_2$ has been formed on the upper surface of the film stack in preparation for a first pattern and etch process.

Figure 4B:
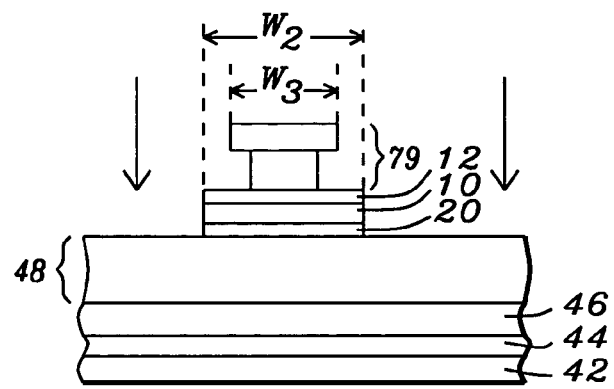

Referring next to FIG. 4b, there is shown the results of the first pattern and etch process whereby layers (20), (10) and (12) of the film are reduced to a desired final lateral dimension ($W_2$) of the spacer layer (20). The patterning and etch process was accomplished using the bi-layer lift-off photolithographic mask shown as (77) in FIG. 4a. The etch is accomplished by ion-beam milling (IBE) or a reactive ion etch (RIE) (shown as arrows) which etches down to the upper surface of the pinned layer (48) and removes portions of the film within a region peripherally disposed to the region directly beneath the mask. Subsequent to the etch, the same mask can be used as a deposition mask to deposit a layer of dielectric material (such as alumina) as an insulating refill layer within the region of removed film, however this layer is not shown. The first mask has been removed and a second bi-layer lift-off photolithographic mask (79) has been formed to a width $W_3$ and aligned centrally on the surface of the capping layer (20). This mask will be used for the second pattern and etch process.

Figure 4C:
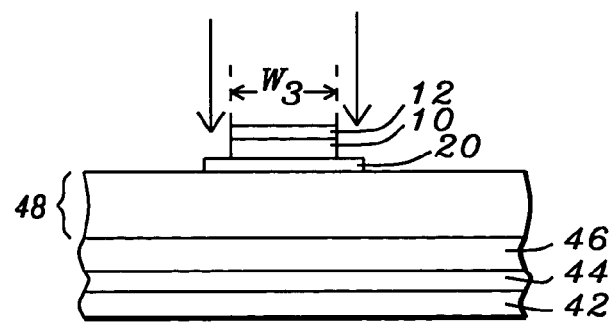

Referring next to FIG. 4c, there is shown schematically the results of the second pattern and etch process whereby the capping layer (12) and the free layer (10) have both reduced to their desired final lateral dimension, $W_3$, and the second mask has been removed. As in the first process of FIG. 4b, this second etch has been accomplished by use of the bi-layer lift-off photolithographic mask, (79) in FIG. 4b, that is aligned and centered on the upper surface of the capping layer (12). This mask is used first as an etch mask in conjunction with ion beam milling or a reactive ion etch (arrows) down to the level of the spacer layer (20), then as a deposition mask to deposit a dielectric refill layer (not shown) on the surrounding area. The final configuration of FIG. 4c is that also shown in FIG. 2. Neither FIG. 4c nor FIG. 2 show surrounding layers of insulation that would be formed subsequent to the patterning and etching. The omission of the insulation is done to more clearly display the structure of the present invention.

As is understood by a person skilled in the art, the preferred embodiments of the present invention are illustrative of the present invention rather than limiting of the present invention. Revisions and modifications may be made to methods, materials, structures and dimensions employed in a CPP GMR sensor of the synthetic spin valve type having reduced resistance and increased sensitivity, while still providing such a CPP GMR sensor of the synthetic spin valve type having reduced resistance and increased sensitivity as described herein, in accord with the spirit and scope of the present invention as defined by the appended claims.

What is claimed is:

1. A CPP GMR sensor of the synthetic spin valve type comprising:
    a substrate;
    a GMR stack formed on said substrate, said stack having a first uniform lateral cross-section;
    a patterned conducting non-magnetic spacer layer formed on said GMR sensor stack, said layer having a second lateral cross-section with a smaller cross-sectional area than said first lateral cross-section; and
    a patterned capped ferromagnetic free layer formed with a third, uniform, lateral cross-section on said spacer layer, said third cross-section being smaller in area than said second cross-section and said capped ferromagnetic free layer comprising a ferromagnetic free layer on which is formed a conducting, non-magnetic capping layer.

2. The CPP GMR sensor of claim 1 wherein said GMR stack comprises:
    a seed layer;
    a pinning layer formed of an antiferromagnetic material formed on said seed layer;
    a synthetic antiferromagnetic pinned layer formed on said pinning layer, said pinned layer further comprising:
        a first ferromagnetic layer;
        an antiferromagnetically coupling layer formed on said first ferromagnetic layer;
        a second ferromagnetic layer formed on said coupling layer; and
        wherein the magnetizations of said first and second ferromagnetic layers are antiparallel.

3. The CPP GMR stack of claim 2 wherein said first ferromagnetic layer is a layer of CoFe formed to a thickness between approximately 20 and 60 angstroms.

4. The CPP GMR stack of claim 2 wherein said second ferromagnetic layer is a layer of CoFe formed to a thickness between approximately 20 and 60 angstroms.

5. The CPP GMR stack of claim 2 wherein said coupling layer is a layer of Ru formed to a thickness between approximately 6 and 9 angstroms.

6. The CPP GMR sensor of claim 1 wherein the first uniform lateral cross-section of each layer is substantially square and has substantially the same lateral dimension which is approximately 0.3 microns or greater.

7. The CPP GMR sensor of claim 1 wherein said conducting, non-magnetic spacer layer is a layer of Cu formed to a thickness between approximately 20 and 100 angstroms.

8. The CPP GMR sensor of claim 7 wherein said second uniform lateral cross-section is substantially square and has a lateral dimension between approximately 0.2 and 0.4 microns.

9. The CPP GMR sensor of claim 8 wherein said conducting, non-magnetic spacer layer is centered on said GMR stack.

10. The CPP GMR sensor of claim 1 wherein said capped ferromagnetic free layer further comprises a ferromagnetic layer of CoFe, CoNiFe or CoFe/NiFe formed to a thickness between approximately 20 and 60 angstroms, on which is formed a capping layer of Cu, formed to a thickness between approximately 5 and 50 angstroms.

11. The CPP GMR sensor of claim 1 wherein said capped ferromagnetic layer is formed to a third, uniform lateral cross-section, which is a substantially square cross-section between approximately 0.03 and 0.1 angstroms in lateral dimension.

12. The CPP GMR sensor of claim 1 wherein said capped ferromagnetic layer is formed centered on said non-magnetic spacer layer.

13. A method of forming a CPP GMR sensor of the synthetic spin valve type comprising:
    providing a substrate;
    forming on said substrate a CPP GMR film stack, said film stack including a GMR stack portion, on which is formed a non-magnetic spacer layer, upon which is formed a capped free layer portion and said film stack having a common width $W_1$;
    patterning said capped free layer portion and said non-magnetic spacer layer portion of said stack to a common width $W_2$ where $W_2$ is less than $W_1$; and then
    patterning said capped free layer portion to a common width $W_3$, where $W_3$ is less than $W_2$.

14. The method of claim 13 wherein said GMR stack portion comprises:
    a seed layer;
    a pinning layer formed of an antiferromagnetic material formed on said seed layer;
    a synthetic antiferromagnetic pinned layer formed on said pinning layer, said pinned layer further comprising:
        a first ferromagnetic layer;
        an antiferromagnetically coupling layer formed on said first ferromagnetic layer;
        a second ferromagnetic layer formed on said coupling layer; and
        wherein the magnetizations of said first and second ferromagnetic layers are antiparallel.

15. The method of claim 14 wherein said first ferromagnetic layer is a layer of CoFe formed to a thickness between approximately 20 and 60 angstroms.

16. The method claim 14 wherein said second ferromagnetic layer is a layer of CoFe formed to a thickness between approximately 20 and 60 angstroms.

17. The method claim 14 wherein said coupling layer is a layer of Ru formed to a thickness between approximately 6 and 9 angstroms.

18. The method of claim 13 wherein $W_1$ is approximately 0.3 microns or greater.

19. The method of claim 13 wherein said conducting, non-magnetic spacer layer is a layer of Cu formed to a thickness between approximately 20 and 100 angstroms.

20. The method of claim 13 wherein $W_2$ is between approximately 0.2 and 0.4 microns.

21. The method of claim 13 wherein said capped ferromagnetic free layer comprises a ferromagnetic layer of CoFe, CoNiFe or CoFe/NiFe formed to a thickness between approximately 20 and 60 angstroms, on which is formed a capping layer of Cu, formed to a thickness between approximately 5 and 50 angstroms.

22. The method of claim 13 wherein $W_3$ is between approximately 0.03 and 0.1 angstroms in lateral dimension.

23. The method of claim 13 wherein said first patterning is accomplished using a first bi-layer lift-off photolithographic mask of width $W_2$ formed on said capping layer and an ion-beam etch or a reactive ion etch and said etch removes all portions of the capping layer, the free layer and the non-magnetic spacer layer peripherally disposed to a region directly beneath said mask.

24. The method of claim 13 wherein said second patterning is accomplished using a second bi-layer lift-off photolithographic mask of width $W_3$ formed on said capping layer and an ion-beam etch or a reactive ion etch and said etch removes all portions of the capping layer and the free layer peripherally disposed to a region directly beneath said mask.

25. The method of claim 24 wherein said second bi-layer lift-off mask is centrally aligned and symmetrically disposed on said capping layer.

* * * * *